United States Patent
Sharma

(10) Patent No.: US 8,782,211 B1
(45) Date of Patent: Jul. 15, 2014

(54) DYNAMICALLY SCHEDULING TASKS TO MANAGE SYSTEM LOAD

(75) Inventor: Ajit Sharma, Jaipur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 739 days.

(21) Appl. No.: 12/974,900

(22) Filed: Dec. 21, 2010

(51) Int. Cl.
G06F 15/173 (2006.01)

(52) U.S. Cl.
USPC .......................... 709/224; 709/225; 709/226

(58) Field of Classification Search
USPC .................................. 709/217–219, 224–226
See application file for complete search history.

(56) References Cited

U.S. PATENT DOCUMENTS

| | | | |
|---|---|---|---|
| 6,243,749 B1 | 6/2001 | Sitaraman et al. | |
| 6,353,847 B1 * | 3/2002 | Maruyama et al. | 718/105 |
| 6,578,074 B1 | 6/2003 | Bahlmann | |
| 6,957,276 B1 | 10/2005 | Bahl | |
| 6,982,953 B1 | 1/2006 | Swales | |
| 7,178,059 B2 | 2/2007 | Greenspan et al. | |
| 7,197,549 B1 | 3/2007 | Salama et al. | |
| 7,292,538 B1 | 11/2007 | O'Rourke et al. | |
| 7,321,893 B1 | 1/2008 | Rambacher et al. | |
| 7,386,629 B2 | 6/2008 | Rover et al. | |
| 7,533,165 B2 | 5/2009 | Makino | |
| 7,590,420 B1 * | 9/2009 | Zaghloul et al. | 455/435.2 |
| 7,624,181 B2 | 11/2009 | Townsley et al. | |
| 7,648,070 B2 | 1/2010 | Droms et al. | |
| 7,792,942 B1 | 9/2010 | Regan et al. | |
| 7,912,975 B2 * | 3/2011 | Grossner et al. | 709/232 |
| 7,937,473 B2 * | 5/2011 | Nakadai | 709/226 |
| 7,991,863 B2 | 8/2011 | Zhao | |
| 8,036,237 B2 | 10/2011 | Kolli et al. | |
| 8,051,174 B2 * | 11/2011 | Xiao et al. | 709/226 |
| 2003/0076805 A1 | 4/2003 | Agrawal et al. | |

(Continued)

FOREIGN PATENT DOCUMENTS

| | | |
|---|---|---|
| JP | 2004356920 A | 12/2004 |
| WO | 03081875 A1 | 10/2003 |
| WO | 2005050897 A2 | 6/2005 |

OTHER PUBLICATIONS

Juniper Networks, Inc., "JUNOS Software Subscriber Access Configuration Guide—DHCP Auto Logout Overview", Release 9.4, Jan. 15, 2009, retrieved from the internet: URL: http://www.juniper.net/techpubs/en_US/junos9.4/information-products/topic-collections/subscriber-access/swconfig-subscriber-access.pdf, 38 pp.

(Continued)

*Primary Examiner* — Backhean Tiv
(74) *Attorney, Agent, or Firm* — Shumaker & Sieffert, P.A.

(57) ABSTRACT

An example network device includes a data repository configured to store data defining a plurality of time slots, programmable processors that provide an amount of available system processing capacity for each of the time slots, a network communication protocol module configured to perform network communication events, and a system load prediction module. The system load prediction module predicts future events that the network device expects to perform in accordance with the network communication protocol, wherein each of the predicted events requires an amount of system processing capacity to complete, and distributes each of the predicted events across the time slots to reserve the amount of system processing capacity required to complete each of the predicted events from the amount of available system processing capacity of each of the time slots without exceeding a threshold that limits utilization of the amount of system processing capacity for each of the time slots.

19 Claims, 5 Drawing Sheets

| Time Slot | Expected Load | Reserved Buffer |
|---|---|---|
| 1 | Wa | z |
| 2 | Wa + Wc + Wd | z |
| 3 | Wa+Wb | z |
| 4 | Wa + Wc + Wd | z |
| ⋮ | ⋮ | ⋮ |
| N | Wa + Wb | z |

(56) References Cited

U.S. PATENT DOCUMENTS

| | | | |
|---|---|---|---|
| 2003/0208523 A1* | 11/2003 | Gopalan et al. | 709/201 |
| 2005/0044273 A1 | 2/2005 | Bouchat et al. | |
| 2005/0097223 A1 | 5/2005 | Shen et al. | |
| 2005/0122946 A1 | 6/2005 | Won | |
| 2005/0193113 A1* | 9/2005 | Kokusho et al. | 709/225 |
| 2005/0253718 A1 | 11/2005 | Droms et al. | |
| 2005/0253722 A1 | 11/2005 | Droms et al. | |
| 2005/0286518 A1 | 12/2005 | Park et al. | |
| 2006/0031488 A1 | 2/2006 | Swales | |
| 2006/0047791 A1 | 3/2006 | Bahl | |
| 2006/0120282 A1* | 6/2006 | Carlson et al. | 370/229 |
| 2006/0129684 A1* | 6/2006 | Datta | 709/229 |
| 2006/0130042 A1* | 6/2006 | Dias et al. | 717/168 |
| 2006/0155563 A1 | 7/2006 | Banerjee et al. | |
| 2006/0221846 A1 | 10/2006 | Dyck et al. | |
| 2007/0002833 A1 | 1/2007 | Bajic | |
| 2007/0180499 A1 | 8/2007 | Van Bemmel | |
| 2007/0203999 A1 | 8/2007 | Townsley et al. | |
| 2007/0214267 A1* | 9/2007 | Ogura et al. | 709/226 |
| 2007/0214352 A1 | 9/2007 | Convery et al. | |
| 2008/0046597 A1 | 2/2008 | Stademann et al. | |
| 2008/0065747 A1 | 3/2008 | Kubota | |
| 2008/0066073 A1* | 3/2008 | Sen | 718/105 |
| 2008/0109547 A1* | 5/2008 | Bao et al. | 709/224 |
| 2008/0172312 A1* | 7/2008 | Synesiou et al. | 705/34 |
| 2008/0183865 A1* | 7/2008 | Appleby et al. | 709/224 |
| 2009/0092045 A1 | 4/2009 | Wu et al. | |
| 2009/0154406 A1 | 6/2009 | Kim et al. | |
| 2009/0157870 A1* | 6/2009 | Nakadai | 709/224 |
| 2009/0222544 A1* | 9/2009 | Xiao et al. | 709/223 |
| 2009/0257425 A1 | 10/2009 | Sastry et al. | |
| 2010/0008319 A1* | 1/2010 | Awano | 370/329 |
| 2010/0042707 A1 | 2/2010 | Zhao | |
| 2010/0042714 A1 | 2/2010 | Choi et al. | |
| 2010/0191813 A1 | 7/2010 | Gandhewar et al. | |
| 2010/0191839 A1 | 7/2010 | Gandhewar et al. | |
| 2010/0205292 A1* | 8/2010 | Diaz | 709/224 |
| 2010/0228858 A1* | 9/2010 | Eilam et al. | 709/224 |
| 2011/0173109 A1* | 7/2011 | Synesiou et al. | 705/34 |
| 2012/0066684 A1* | 3/2012 | Takami | 718/102 |
| 2012/0079097 A1* | 3/2012 | Gopisetty et al. | 709/224 |
| 2012/0131108 A1* | 5/2012 | Barsness et al. | 709/206 |
| 2012/0147828 A1* | 6/2012 | Wigren | 370/329 |
| 2012/0151053 A1* | 6/2012 | Kato | 709/224 |
| 2012/0271939 A1* | 10/2012 | Gulley et al. | 709/224 |
| 2013/0170356 A1* | 7/2013 | Awano | 370/236 |

OTHER PUBLICATIONS

Droms, "Dynamic Host Configuration Protocol", RFC 2131, IETF Standard, Internet Engineering Task Force, Mar. 1997, 46 pp.

Alexander et al., "DHCP Options and BOOTP Vendor Extensions", RFC 2132, IETF Standard, Internet Engineering Task Force, Mar. 1997, 35 pp.

Patrick., "DHCP Relay Agent Information Option", RFC 3046, IETF Standard, Internet Engineering Task Force, Jan. 2001, 15 pp.

Reynolds et al., "Assigned Numbers," RFC 1700, Oct. 1994, 215 pp.

Rigney et al., "Remote Authentication Dial in User Service (Radius)," RFC 2865, Jun. 2000, 71 pp.

Droms et al., "Dynamic Host Configuration Protocol for IPv6 (DHCPv6)," RFC 3315, IETF Standard, Internet Engineering Task Force, Jul. 2003, 17 pp.

Lai, "Change (Spoof) MAC Address on Windows 2000, XP, 2003, VISTA, 2008, Windows 7," KLC Consulting, Inc., May 2007, retrieved from the internet: URL: http://www.klcconsulting. netichange_mac_w2k.htm, 8 pp.

File Buzz, "Change Mac Address," retrieved from the internet: URL: http://www.filebuzz.com/files/Change_Mac_Address/1.html, 4 pp, last visited: Jul. 9, 2010.

File Buzz, "Gentle MAC Pro v4.0," Solar System Technologies, Jul. 4, 2007, retrieved from the internet: URL: http://www.filebuzz.com/fileinfo/32000/Gentle_MAC_Pro.html, 2 pp.

File Buzz, "MacIP Change v1.0," Fusion Soluciones Informaticas, Jul. 5, 2007, retrieved from the internet: URL: http://www.filebuzz.com/fileinfo/36702/MacIP_Change.html, 2 pp.

McAuley et al. "Experience with Autoconfiguring a Network with IP Addresses", Proceedings: Communications for Network-Centric Operations: Creating the Information Force, Oct. 28-30, 2001, McLean, VA, Telcordia Technologies, Inc., 2001, p. 272-276.

Droms, R. and R. Cole,"An Inter-server Protocol for DHCP; draft-ietf-dhc-interserver-01.txt" Network Working Group, Internet Draft, Mar. 1997, p. 1-31.

* cited by examiner

| Time Slot | Expected Load | Reserved Buffer |
|---|---|---|
| 1 | Wa | z |
| 2 | Wa + Wc + Wd | z |
| 3 | Wa+Wb | z |
| 4 | Wa + Wc + Wd | z |
| ⋮ | ⋮ | ⋮ |
| N | Wa + Wb | z |

FIG. 3

DYNAMICALLY SCHEDULING TASKS TO MANAGE SYSTEM LOAD

TECHNICAL FIELD

This disclosure relates to network devices and, more particularly, managing system events of the network devices.

BACKGROUND

Network devices are becoming more complex as scaling requirements are increasing. For example, given the increase of the number of subscriber devices that request access to a public network, network devices that manage these subscriber devices are required to perform an increasing number of system specific activities, which may be referred to as system events, and process network protocol specific control packets related to manage the increasing number of these subscriber devices. In this way, network devices are required to scale to handle the additional subscriber devices, which involves more complexity as each subscriber device typically increases the number of system events and network protocol specific control packets for which the network devices must maintain to adequately manage the subscriber devices.

Currently, these types of network devices manage the execution of these system events and the processing of the control packets using a "best efforts" method. That is, when there are more events than can be processed by the network device within the given period of time, the network device completes as many of these events as possible within the given period of time. When a burst of system events occurs within the network device, the burst of activities tend to create synchronization between different protocols and system events occurring during the burst of system events and may result in similar bursts occurring at regular intervals, thus preventing the network device from being able to process at least some control packets during the regular bursts. In the case of network protocol specific control packets, the network devices rely upon each network protocol's retransmission mechanisms to resend control packets and otherwise handle the client from which the unprocessed control packets originated.

Furthermore, as the network devices become more complex, the system specific activities may require more resources of the network device and take longer to complete. For example, when the controller element collects statistical information from other hardware elements of the network device, the controller element may be required to fetch statistical information for thousands of clients handled by the network device. In this way, network devices that manage subscriber devices are increasingly under pressure to handle more subscriber devices, which results in scaling issues that limits the ability of the network devices to properly service or otherwise manage the subscriber devices. Requiring retransmission of control packets and delay of system events may cause service disruptions or otherwise impact the ability of subscriber devices to access the network in a timely manner.

SUMMARY

In general, this disclosure is directed to techniques for dynamically scheduling planned events of a network device in order to manage the system load of the network device. For example, this disclosure describes techniques by which a network device may predict future system load of the network device in order to schedule system specific activities such that the predicted future system load is minimized for any given future point in time. More specifically, this disclosure describes techniques by which a network device analyzes the timing of control packets and system specific activities that occur at regular intervals to plan the occurrence of the future events and predict the future system load of the network device. The network device then dynamically schedules control packets and the system specific activities in a manner that minimizes the predicted future system load at any given time.

In one example, a method includes storing, with a network device, data defining a plurality of time slots, wherein the network device includes one or more processors that provide an amount of system processing capacity for each of the plurality of time slots, and executing a network communication protocol with the one or more processors. The method also includes executing a load prediction software module that computes a prediction of one or more future network communication events that the network device is expected to perform in accordance with the network communication protocol, wherein the load prediction software module computes for each of the predicted future network communication events an amount of system processing capacity required from the one or more processors to complete in accordance with the network communication protocol. The method further includes distributing each of the predicted future network communication events across the plurality of time slots to reserve the amount of system processing capacity required to complete each of the predicted future network communication events distributed to each of the plurality of time slots from the amount of available system processing capacity of each of the plurality of time slots without exceeding a threshold associated with the plurality of time slots, wherein the threshold limits utilization of the amount of system processing capacity for each of the plurality of time slots.

In another example, a network device includes a data repository configured to store data defining a plurality of time slots, one or more programmable processors that provide an amount of system processing capacity for each of the plurality of time slots, a network communication protocol module executable by the one or more programmable processors to perform network communication events in accordance with a network communication protocol, and a system load prediction module. The system load prediction module is configured to compute a prediction of one or more future network communication events that the network device is expected to perform in accordance with the network communication protocol, compute, for each of the predicted future network communication events, an amount of system processing capacity required from the one or more programmable processor to complete in accordance with the network communication protocol, and distribute each of the predicted future network communication events across the plurality of time slots to reserve the amount of system processing capacity required to complete each of the predicted future network communication events distributed to each of the plurality of time slots from the amount of available system processing capacity of each of the plurality of time slots without exceeding a threshold associated with the plurality of time slots, wherein the threshold limits utilization of the amount of system processing capacity for each of the plurality of time slots.

In another example, a computer-readable storage medium is encoded with instructions for causing one or more programmable processors of a network device to store data defining a plurality of time slots, wherein the one or more processors that provide an amount of system processing capacity for each of the plurality of time slots, and execute a network communication protocol. The instructions also cause the one or more programmable processors to execute a load prediction module that computes a prediction of one or more future network communication events that the network device is expected to perform in accordance with the network communication protocol, wherein the load prediction module computes for each of the predicted future network communication events an amount of system processing capacity required from the one or more processors to complete in accordance with the network communication protocol. The instructions also cause the one or more programmable processors to distribute each of the predicted future network communication events across the plurality of time slots to reserve the amount of system processing capacity required to complete each of the predicted future network communication events distributed to each of the plurality of time slots from the amount of available system processing capacity of each of the plurality of time slots without exceeding a threshold associated with the plurality of time slots, wherein the threshold limits utilization of the amount of system processing capacity for each of the plurality of time slots.

In another example, a method includes storing, with a network device, data defining a plurality of time slots, wherein the network device includes one or more processors that provide an amount of system processing capacity for each of the plurality of time slots, and executing a dynamic host configuration protocol (DHCP) with the one or more processors. The method further includes executing a load prediction software module that computes a prediction of one or more future DHCP events that the network device is expected to perform in accordance with the DHCP, wherein the load prediction software module computes for each of the predicted future DHCP events an amount of system processing capacity required from the one or more processors to complete in accordance with the DHCP, and distributing the predicted future DHCP events across the plurality of time slots to reserve the amount of system processing capacity required to complete the predicted future DHCP events from the amount of available system processing capacity of each of the plurality of time slots without exceeding a threshold associated with the plurality of time slots, wherein the threshold limits utilization of the amount of system processing capacity for each of the plurality of time slots.

The techniques of this disclosure may provide one or more advantages. For example, the techniques described may enable a network device to plan predicted events to distribute the utilization of system resources and minimize the system load at any given time. By minimizing the system load, the retransmission of control packets or other system performance problems may be reduced. Furthermore, protocols that rely upon keep-alive packets may utilize current system load information and predicted future system load information to avoid sending packets when the network device may be overloaded and unable to respond to the keep-alive packets within the required time period. Instead, the protocols may send the keep-alive packets at an earlier time when the system load of the network device is comparatively lower, which may prevent an inappropriate triggering of failover procedures. In this manner, the system resources of a network device may be utilized more efficiently such that the network device may be able to support more clients than the network device may have otherwise been able to support while minimizing performance and network problems associated with task bursts.

The details of one or more embodiments of the techniques of this disclosure are set forth in the accompanying drawings and the description below. Other features, objects, and advantages will be apparent from the description and drawings, and from the claims.

BRIEF DESCRIPTION OF DRAWINGS

FIG. 3 is a conceptual diagram illustrating an example load prediction table consistent with this disclosure.

DETAILED DESCRIPTION

Figure 1:
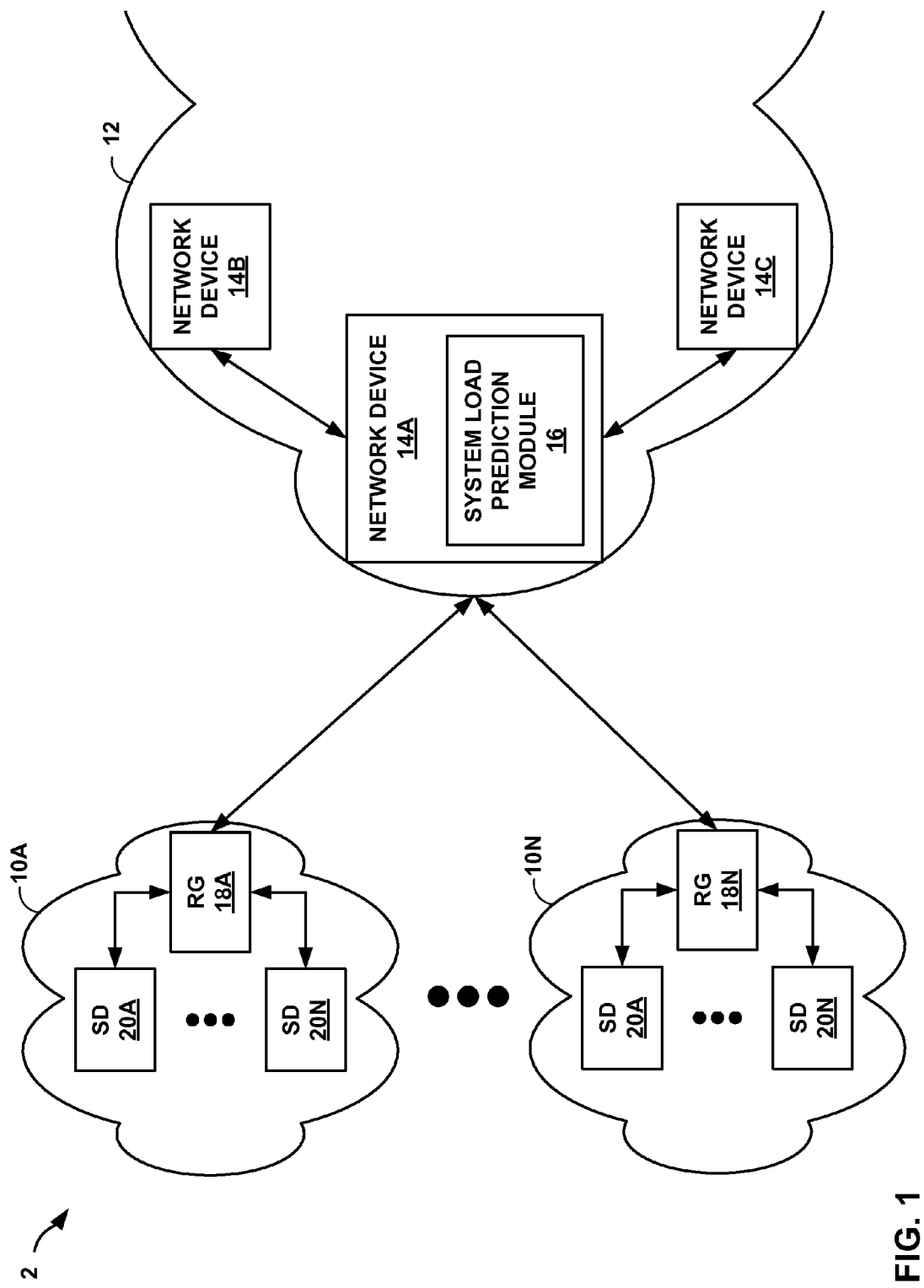
FIG. 1 is a block diagram illustrating an example network system that implements the techniques of this disclosure.

FIG. 1 is a block diagram illustrating an example network system 2 that implements the techniques of this disclosure. As illustrated in FIG. 1, network system 2 includes subscriber networks 10A-10N (collectively, "subscriber networks 10") and access network 12. Subscriber networks 10 each includes one of residential gateways (RG) 18A-18N (collectively, "residential gateways 18") and subscriber devices (SD) 20A-20N (collectively, "subscriber devices 20"). It should be understood that the letter "N" is used to represent an arbitrary number of devices, and moreover, that the number of subscriber devices 20 is not necessarily equal to the number of residential gateways 18, although the cardinality for both subscriber devices 20 and residential gateways 18 is designated using the same variable "N." Furthermore, while each of subscriber networks 10 is illustrated as including a set of subscriber devices 20A-20N and a single one of residential gateways 18, the number of subscriber devices 20 and residential gateways 18 included within each subscriber network 10 may be different and techniques described in this disclosure should not be limited to the example of FIG. 1 in this respect.

Each of residential gateways 18 provides a gateway by which the corresponding set of subscriber devices 20 connect to access network 12 and thereby access a public network, such as the Internet. Each of residential gateways 18 typically comprises a wireless router or other home networking device, such as a hub, a switch, a router, a cable modem, a digital subscriber line (DSL) modem or any other device that provides access or otherwise connects subscriber devices 20 to access network 12. Typically, subscriber devices 20 are connected to residential gateway 18 via wired or wireless layer two (L2) network protocols, such as Ethernet or 802.11g. Reference to layers in this disclosure followed by a number refers to a corresponding numbered layer of the Open Systems Interconnection (OSI) reference model. Examples of subscriber devices 20 include personal computers, laptop computers, workstations, tablet computers, personal digital assistants (PDAs), wireless devices, network-ready appliances, cellular phones (including so-called "smart phones"), personal media devices, and the like.

Access network 12 may represent a public network that is owned and operated by an Internet service provider (ISP) to provide network access to one or more of subscriber devices 20. As a result, access network 12 may be referred to herein as a service provider (SP) network. While the example network system 2 illustrated in FIG. 1 includes one access network 12, other examples may include multiple access networks 12 and techniques described in this disclosure should not be limited to the example of FIG. 1 in this respect.

Access network 12 shown in the example of FIG. 1 includes network devices 14A-14C (collectively, "network devices 14"). Each of network devices 14 may comprise a layer two (L2) switch, a layer three (L3) router or another type of network device that facilitates the transfer of data within network system 2. In some examples, network devices 14 may also perform bridging functions, firewall functions, intrusion detection and prevention functions, security functions, client management functions (e.g., dynamic host configuration protocol (DHCP) functions), or other network functions. The DHCP protocol is described in RFC 2131, entitled "Dynamic Host Configuration Protocol" to R. Droms, March 1997, the entire content of which is incorporated herein by reference. Further, although shown and described as providing L3 services, network devices 14 may be any network element that provides services for other layers of the OSI model or, as it is commonly known, the network stack. As one example, network device 14A may represent a network router that integrates L2 and L3 services so as to provide L2 forwarding services as well as L3 routing functions. As shown in the example of FIG. 1, network device 14A represents an edge router in that it resides at the edge of access network 12 and performs L3 routing functions to facilitate the exchange of data between subscriber networks 10 and access network 12.

Typically, network device 14A provide various services to subscriber networks 10, network devices 14B and 14C, and other network devices not shown in FIG. 1. In one example, network device 14A is configured to provide subscriber networks 12 and residential gateways 18 with DHCP service. When a residential gateway 18 first connects to network device 14A, residential gateway 18 and network device 14A exchange an initial set of message (e.g., perform an initial handshake) in order to configure residential gateway 18. After the initial handshake, network device 14A receives DHCP renewal control packets from residential gateways 18 at regular intervals. In this manner, network device 14A may provide support for various network protocols and perform various system specific activities that each may include events that do not occur at regular intervals, events that occur at regular intervals, and events that network device 14A may be scheduled to occur at a particular time and/or before a configurable time limit expires.

In another example, network device 14A is included in a high availability configuration with network devices 14B and 14C such that if network device 14A fails, at least one of network devices 14B and 14C performs the functions previously performed by network device 14A. Typically, in a high availability configuration, network devices 14 would exchange messages with each other at regular intervals (e.g., polling events) to determine whether one of the network devices 14 has failed. For example, network device 14A may send a message to network device 14B (e.g., poll network device 14B) at regular intervals to determine if network device 14B is operational. Network device 14A may also receiving polling events from network device 14B. If network device 14A does not respond to the received polling events within a configurable time, network device 14B determines that network device 14A has failed and initiates a failover sequence to cause network device 14B to perform the functions previously performed by network device 14A.

In another example, network device 14A is configured to perform various system specific activities and provide support for several different network protocols. For example, network device 14A may fetch statistical information from hardware installed within network device 14A, poll the state of hardware elements installed in network device 14A to determine if one or more of the hardware elements has failed (e.g., in a high availability configuration with redundant hardware elements), and analyze system resource utilization. Network device 14A may also support for point-to-point protocol (PPP), access node control protocol (ANCP), mobile internet protocol (Mobile-IP), multiprotocol label switching (MPLS) based keep-alive mechanisms, various other protocols that rely upon device-initiated keep-alive packets (e.g., the layer two tunnel protocol (L2TP) hello mechanism), and any other network protocol that utilizes signaling to establishing timing of events. Each of the different protocols may include control packets that have different timing requirements (e.g., a time limit within which network device 14A must process the control packet). The protocols may also include control packets that recur at a predictable interval and/or control packets for which no information is available as to when the control packets may be received by network device 14A (e.g., initial handshake control packets).

Conventionally, network devices manage the execution of the events using a "best efforts" method. That is, conventional network devices may share the system capacity among all of the events that occur at a given time using, for example, a round-robin technique where each event is granted an equal portion of processing time and all events are handled in a circular order until each event is completed. Events may include system specific activities (e.g., system events such as hardware polling) or network protocol control packets, as non-limiting examples. Each event requires a certain amount of system resources to complete, causing the system to experience some amount of system load. In general, the system load is a snapshot of the total amount of work performed by the system at a particular time. When a burst of events occurs (e.g., when a large number of DHCP clients request renewal in a short time frame), some of the events may not be completed in a timely manner because there may not be sufficient system capacity to perform all of the events within the required time. Furthermore, when there is a burst of events, the events tend to synchronize with each other such that similar event bursts may occur at regular intervals.

Rather than implement a best effort form of scheduling that involves scheduling all of these future tasks independently or without regard for any other tasks, network device 14A implements the techniques described in this disclosure to dynamically schedule predicted future events to reduce system load. In accordance with the techniques of this disclosure network device 14A includes system load prediction module 16. In general, system load prediction module 16 predicts the future system load of network device 14A based on information stored about past received control packets and system events and planned future control packets and planned future system events. System load prediction module 16 schedules the planned future control packets and system events at times when the predicted future system load of network device 14A is sufficiently low to process the control packets and perform the system events. In this way, system load prediction module 16 may minimize the possibility of performance problems and may reduce the retransmission of control packets. Control packets and system events may be commonly referred to as "events" for purposes of clarity. Thus, when the specification refers to an "event," the event may relate to a network communication event (e.g., receiving a protocol control packet or sending a protocol control packet) or a system event.

In order to schedule future control packets and system events, System load prediction module 16 exchanges messages with other software and hardware elements of network device 14A, such as a DHCP module, and analyzes configuration information of network device 14A. In one example, when network device 14A receives a network protocol control packet (e.g., from one of residential gateways 18 or of subscriber devices 20), which will, in turn, trigger control packets at regular intervals, the control packet is directed to the element within the network device that is configured to process the control packet. The element examines the control packet to determine the regular interval at which this packet is currently configured to arrive. The element generates a message based on the control packet, and sends the message to system load prediction module 16 using internal communication protocols between that are configured between the elements and system load prediction module 16 in order to request that system load prediction module 16 reserve system capacity for the element to process the control packet at regular intervals. The message may include information about the particular protocol received by the element, the type of control packet received by the element, one or more requested renewal intervals, and/or one or more requested times to schedule the processing of the control packet. In another example, system load prediction module 16 is configured to retrieve configuration information of network device 14A from a storage element of network device 14A (e.g., a database stored on a storage device).

System load prediction module 16 utilizes the messages and configuration information to maintain information about the predicted future system load. The predicted future system load may be divided into time slots, where each time slots represents some amount of time. In one example, a time slot includes a configurable amount of time. The configurable amount of time may be any amount of time, including a nanosecond, a millisecond, a second, ten seconds, or a minute, as non-limiting examples. In another example, a time slot includes the amount of time it takes for network device 14A to perform a unit of work. That is, the amount of time included in each time slot may vary between different network devices and may be dependent upon the processing capabilities (e.g., the speed) of the network devices.

In accordance with one embodiment, system load prediction module 16 categorizes the control packets and system events into one of various different types of control packets or system events. For example, system load prediction module 16 categorizes control packets into control packets for which no timing information is available (e.g., no information as to when future control packets may be received by network device 14A), control packets that network device 14A receives periodically but cannot control or configure when the control packets are received by network device 14A, and control packets that network device 14A receives periodically and can control or configure the timings when the client should send these control packets. Similarly, system load prediction module 16 categorizes system events into system events that do not occur at regular time intervals, system events that occur at regular time intervals but whose timings cannot be controlled, and system events that occur at regular time intervals and whose timing can be controlled.

In order to identify system events or control packets that occur at regular intervals, system load prediction module 16 analyzes one or more of configuration information of network device 14A, information included within the control packets (e.g., information identifying the protocol of the control packet and the information requested by the control packet), and historical information about previously performed system events and previously received control packets. Configuration information of network device 14A may provide system load prediction module 16 with information about system events that network device 14A is configured to perform. The configuration information may also aid system load prediction module 16 in determining whether the system events occur at regular intervals and whether the timing of the each of the system events is configurable.

In examples where system load prediction module 16 analyzes information included within the control packets, system load prediction module 16 may identify the type of network protocol to which a control packet corresponds (e.g., DHCP), the event for which the control protocol was sent (e.g., renewing a DCHP lease), and a time interval at which another control packet of the same type may be received (e.g., the DHCP lease duration). If system load prediction module 16 is not able to determine the recurrence interval from the packet, system load prediction module 16 may determine whether or not the control packet is a recurring control packet based on the identified protocol.

Where system load prediction module 16 determines if the event is a recurring event based on historical event information, system load prediction module 16 analyzes information about past or previous system events and previously received control packets. The historical event information may be organized into time slots similar to those used by system prediction module 16 to maintain the predicted future system load information. System load prediction module 16 may analyze the historical event information to identify control packets and system events that occur at regular intervals. For example, the historical event information may include a sequence of DHCP renewal requests from a group of residential gateways 18. Upon analyzing the historical event information, system load prediction module 16 may determine that the DHCP renewal requests occur once for every ten time slots.

Upon categorizing the control packets and system events, system load prediction module 16 generates information about the predicted future load and stores this predicted future load information to a future load prediction database, memory or other storage device. When initially populating the predicted future load database, system load prediction module 16 first inserts information about system events and control protocols whose timing cannot be controlled. That is, system load prediction module 16 reserves system load capacity for each system event and control protocol packet expected at a particular time slot. In some examples, system load prediction module 16 may reserve a configurable amount of system load capacity at each time slot for processing control packets or system events not yet received by network device 14A and that are to be processed in a particular time slot.

Next, system load prediction module 16 attempts to schedule the predicted future system events and control packets that have configurable timings. For each of these system events and control packets, system load module 16 examines a first time slot that may correspond to a timing specified in the control packet. If the first time slot has sufficient remaining system load capacity to process the predicted packet or perform the predicted system event, system load prediction module 16 reserves the required system capacity in the first time slot. If the first time slot does not have sufficient remaining system load capacity, system load prediction module 16 determines whether the predicted system event or control packet must be scheduled in an earlier occurring time slot (e.g., before the expiration of time limit) or if the predicted system event or control packet may be scheduled at an earlier or a later time slot.

When the predicted system event or control packet must be scheduled in an earlier time slot, system load prediction module 16 examines earlier time slots to determine whether sufficient system load capacity is available in the earlier time slot to process the predicted packet or perform the predicted system event. Once system load prediction module 16 finds an earlier time slot with sufficient system load capacity to process the predicted packet or perform the predicted system event, system load prediction module 16 reserves the requires system capacity in the time slot. If system load prediction module 16 is unable to find a time slot with sufficient available system load capacity, system load prediction module 16 may schedule the predicted system event or control packet in the time slot with the most available system load capacity closest to the time during which it would be scheduled if the network device operated under a best effort scheduling techniques. The best effort scheduling techniques involves scheduling these events independently or without regard to other events. In examples where the predicted system event or control packet may be scheduled in an earlier time slot or a later time slot, system load prediction module 16 examines earlier and/or later time slots until a time slot is found that has sufficient available system load and schedules the predicted system event or predicted control packet to occur during that time slot. In this manner, system load prediction module 16 distributes the planned future control packets and system events across the plurality of time slots to reserve the amount of system processing capacity required to complete each of the predicted future system events and network communications (e.g., control packets) from the amount of available system processing capacity at each of the plurality of time slots without exceeding a threshold associated with the plurality of time slots.

After system load prediction module initially populates the system load prediction database, network device 14A may receive additional control packets or may perform additional system events. Upon network device 14A receiving the additional control packets or being instructed to perform the additional system events, system load prediction module 14A determines the category to which the additional control packet or system event belongs (e.g., no timing information, timing information but not configurable, or timing information and configurable), and schedules the additional control packet or system event as described above.

In this manner, system load prediction module 16 may predict the future system load of network device 14A and plan the occurrence of the predicted future system events and control packets to minimize the system load of network device 14A at any given time and reduce the occurrence of event bursts. Furthermore, in various instances, time-sensitive packets (e.g., keep-alive packets) may be more likely to be processed within the required time, thus reducing false failure indicators that may trigger unneeded failover procedures. By predicting the future system load and scheduling the system activities, the system resources of a network device may be utilized more efficiently such that the network device may be able to support more clients than the network device may have otherwise been able to support while minimizing performance and network problems associated with system event bursts.

Figure 2:
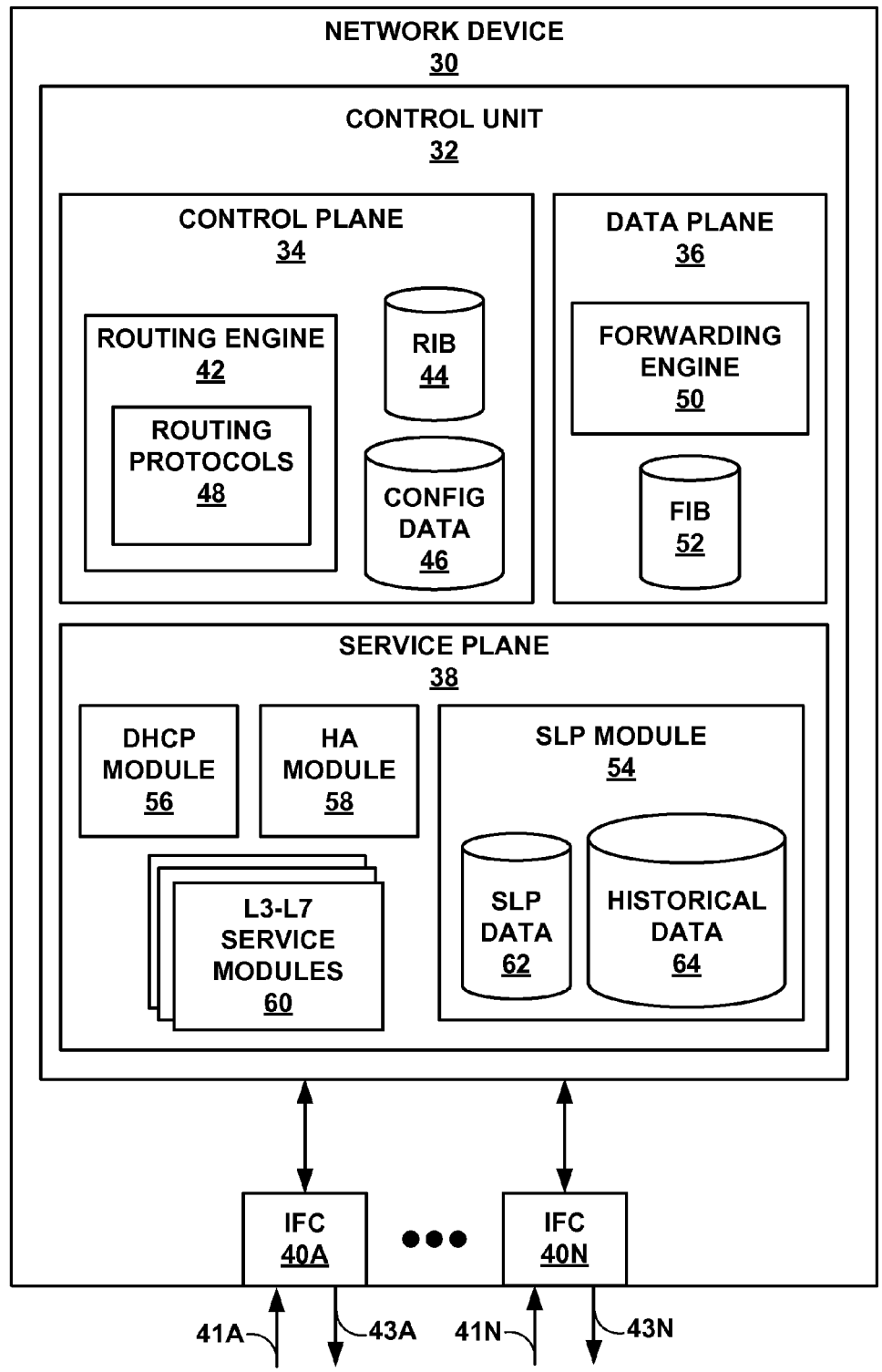
FIG. 2 is a block diagram illustrating an example network device that implements the techniques of this disclosure.

FIG. 2 is a block diagram illustrating an example network device 30 that may implement the techniques of this disclosure. For purposes of illustration, network device 30 may be described below within the context of network system 2 shown in the example of FIG. 1 and may represent network device 14A. In this example embodiment, network device 30 includes control unit 32 and interface cards (IFCs) 40A-40N (collectively, "IFCs 40") that send and receive packet flows or network traffic via inbound network links 41A-41N (collectively, "inbound links 41") and outbound network links 43A-43N (collectively, "outbound links 43"). Network device 30 typically include a chassis (not shown in the example of FIG. 2 for ease of illustration purposes) having a number of slots for receiving a set of cards, including IFCs 40. Each card may be inserted into a corresponding slot of a chassis for communicably coupling the card to a control unit 32 via a bus, backplane, or other electrical communication mechanism. IFCs 40 are typically coupled to network links 41 via a number of interface ports (not shown), and forward and receive packets and control information from control unit 32 via respective paths (which, for ease of illustration purposes, are not explicitly denoted in FIG. 2).

Control unit 32 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 32 may also be divided into three logical or physical "planes" to include a first control or routing plane 34, a second data or forwarding plane 36, and a third service plane 38. That is, control unit 32 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations. Often, control plane 34 may logical implement service plane 38 in that service plane 38 is provided as a virtual service plane executing within control plane 34. In this virtualized service plane implementation, control plane 34 may be considered to perform the functions attributed to service plane 38 below and in some instances this disclosure may ignore this virtualization and refer to system load prediction module (SLP MODULE) 54 executing within control plane 34. In this respect, system load prediction module 54 may execute within either service plane 38 when a dedicated service plane 38 is implemented or within control plane 34 when service plane 38 executes as a virtualized service plane 38 in a virtual environment provided by control plane 34.

Control plane 34 of control unit 32 may provide the routing functionality of network device 30. In this respect, control plane 34 may represent hardware or a combination of hardware and software of control unit 32 that implements routing protocols 48 by which routing information stored within routing information base (RIB) 44 may be determined. The routing information may include information defining a topology of a network, such provider network 12. Control plane 34 may resolve the topology defined by the routing information to select or determine one or more routes through provider network 12. Control plane 34 may then update data plane 36 with these routes, where data plane 36 maintains these routes as forwarding information stored within forwarding information base (FIB) 52. Control plane 34, as illustrated in FIG. 2, also includes configuration data (CONFIG DATA) 46. Configuration data 46 may include device specific configuration information, which may be configured by an administrator. For example, configuration data 46 may include the recurrence rate at which the system is configured to collect statistical information from hardware elements of network device 30.

Forwarding or data plane 36 may include forwarding engine 50, which may be implemented in hardware or a combination of hardware and software of control unit 32 that forwards network traffic in accordance with the forwarding information. Service plane 38 may represent hardware or a combination of hardware and software of control unit 32 responsible for providing and managing one or more services, such as DHCP service. For example, an action may specify to send the packet to service plane 38. In one example, forwarding engine 50 examines the forwarding information stored in FIB 52 corresponding to the packet's routing instance and performs a lookup based on the packet's header information and directs the packet to service plane 38.

Service plane 38, while shown in FIG. 2 as an internal service element, may comprise an external service element (e.g., an external service complex) coupled to network device 30 via one of IFCs 40. Service plane 38 providers an operating environment for service-related modules, including system load prediction module 54, DHCP module 56, and high availability module (HA MODULE) 58. Service plane 38 may include additional service-related modules, illustrated as layer three (L3) through layer seven (L7) service modules (L3-L7 SERVICE MODULES) 60, where layers three through seven refer to the third through seventh layer of the Open Systems Interconnection (OSI) reference model. L3-L7 service modules 60 may perform one or more services, such as quality of service, caching, content delivery network, security, flow blocking, anti-virus (AV) scanning and detection, intrusion detection protection (IDP), firewall services, or other services relating to one or more of layers three through seven of the OSI model. L3-L7 service modules 60 may also provide functionality to support various network protocols, including point-to-point protocol (PPP) and access node control protocol (ANCP).

Each service module of L3-L7 service modules 60 may be installed or configured as an individual module separately from others of L3-L7 service modules 60, high availability module 58, DHCP module 56, and system load prediction module 54 (e.g., "plug-in" service modules into service element 38). Initially, upon powering up or otherwise enabling network device 30, control unit 32 loads, configures and executes system load prediction module 54, DHCP module 56, high availability module 58, and any L3-L7 service modules 560 that may be configured within service plane 38. While the example network device 30 shown in FIG. 2 includes DHCP module 56 and high availability module 58, in other examples, network device 30 may not include DHCP module 56 or high availability module 58.

High availability module 58 provides high availability functionality for network device 30. That is, high availability module 58 exchanges keep-alive packets with other network devices (e.g., network device 14B and 14C of FIG. 1) and triggers failover procedures upon detecting that one or more the other network devices failed. High availability module 58 is configured to exchanges messages with system load prediction module 54 in order to schedule the keep-alive packet processing and other events performed by high availability module 58.

As illustrated in FIG. 2, system load prediction module 54 includes system load prediction data (SLP DATA) 62 and historical data 64. In one example, system load prediction module 54 stores system load information, including predicted future system load information, in system load prediction data 62. One example of system load prediction data 62 is described in more detail with respect to FIG. 3. System load prediction data 62 and historical data 64 each may store information in the form of one or more tables, databases, linked lists, radix trees, or other suitable data structure. In another example, system load prediction module 54 stores system load information in configuration data 46.

In general, system load prediction module 54 predicts the future system load of network device 30 in accordance with the techniques described in this disclosure. That is, system load prediction module 54 estimates the amount of work to be performed by network device 30 at one or more different points in time occurring in the future based on predicted future events. In other words, system load prediction module 54 anticipates the future load on network device 30, in part, by planning future events. System load prediction module 54 also schedules control packets or system events that are schedulable by network device 30 in such a way as to minimize the predicted future system load. Control packets and system events may each be schedulable by network device 30 when system load prediction module 54 may control the timing or recurrence of the control packets or system events, as one example. In another example, a system event is considered schedulable when system load prediction module 54 configures a first occurrence of a system event, whether or not the system event is a recurring system event.

When predicting the future system load, system load prediction module 54 identifies control packets for which no timing information is available, recurring system events and control packets, and schedulable system events and control packets by at least analyzing one or more different sources or types of information. In one example, system load prediction module 54 may analyze historical data, such as a log of earlier occurring system events or previously received control packets stored in historical data 64. When the historical information indicates that a particular system event or control packet occurs at a predictable interval, system load prediction module 54 determines that the system event or control packet is a recurring event and determines the recurrence interval based on the amount of time that elapsed between the prior occurrences of the event.

In another example, system load prediction module 54 may analyze configuration information of network device 30 (e.g., configuration information stored in configuration data 46). The configuration information may include details regarding system events, such as what system events network device 30 is configured to perform and the timing of the system events. In another example, system load prediction module 54 may analyze currently received control packets. The control packets may include information indicating that the control packets are recurring control packets and an interval on which the control packets will recur (e.g., a DHCP request packet that includes an IP address lease time). In some examples, system load prediction module 54 may consider two or more different sources or types of information when predicting the future system load of network device 30 (e.g., historical information and information included within the control packet).

Upon identifying the different types of system events and control packets, system load prediction module 54 plans the occurrence of the system events and control packets into time slots. The each time slot may represent a set amount of time, such one second, or an amount of time that it takes for network device 30 to perform a unit of work, as examples. In other words, the amount of time included in each time slot may vary between different network devices and may be dependent upon the processing capabilities (e.g., the speed) of the network devices. In general, system load prediction module 54 is configured with the amount of work (e.g., amount of processing power) network device 30 may perform during a single time slot. That is, system load prediction module 54 is configured with a threshold associated with the plurality of time slots, where the threshold limits utilization of the amount of system processing capacity for each of the plurality of time slots.

Each control packet or system event requires some amount of work to be performed by network device 30. In one example, system load prediction module 54 is configured with a value for each type of system event or control packet where each value represents the amount of work network device 30 performs to complete the event associated with the system event or control packet. That is, system load prediction module 54 may be configured such that when a DHCP renewal packet is received by network device 30, system load prediction module 54 reserves three units of work, but when a hardware polling event occurs, system load prediction module 54 reserves twenty units of work. In this manner, system load prediction module 54 may apply weightings to the system events or control packets as a complete event or within individual time slots when the event spans multiple time slots.

System load prediction module 54 may limit the number of system events or control packets that may occur within in a single time slot or may limit the amount of work (e.g., the system load) permitted within a single time slot. In some examples, system load prediction module 54 limits the number of system events or control packets within each time slot based on the total system capacity of network device 30. In other examples, system load prediction module 54 reserves a portion of the total system capacity of network device 30 in each time slot in an attempt to ensure a sufficient system capacity remains available to process new system events and/or control packets not analyzed by system load prediction module 54 or to process system events and control packets for which no timing information is available. That is, when system load prediction module 54 plans to process an event in a time slot, system load prediction module 54 reserves sufficient system capacity to perform the event to completion within the selected time slot.

From time to time, system load prediction module 54 may compare the predicted system load with the actual system load at one or more time slots in order to verify the accuracy and correctness of the predicted system load. Furthermore, as the planned future events are predicted, one or more of the planned future events may not actually occur, thus reducing the total system load at one or more time slots. System load prediction module 54 may utilize the actual system load as a feedback mechanism to correct the predicted reserved loads and predicted amount of work required to process certain control packets.

System load prediction module 54 organizes or schedules the occurrence of the system events and control packets by assigning a time slot to each system event and control packet. In one example, system load prediction module 54 first inserts the system events and control packets that system load prediction module 54 identified as recurring events, but are not schedulable into a time slot. The time slot into which the system event or control packet is assigned is determined based on the previously identified recurrence interval and the time at which the system event was last performed or the control packet was last received by network device 30. For example, if a control packet that is not schedulable is determined to be received by network device 30 every sixty seconds and was last received thirty seconds ago, system load prediction module 54 plans for receive the predicted next packet by at least reserving the system load capacity to completely process the predicted next packet in the time slot occurring thirty seconds from now.

After inserting the recurring events into the appropriate time slots, system load prediction module 54 schedules the schedulable predicted future system events and control packets. For each of these system events and control packets, system load prediction module 54 identifies the predicted future time slot based on the recurrence interval for the respective event or packet. If the predicted future time slot has enough remaining capacity to process the event or packet, system load prediction module 54 schedules the event or packet into the predicted future time slot, thus reserving system capacity in the predicted future time slot for the event or packet.

If the predicted future time slot does not have enough remaining capacity, system load prediction module 54 may identify the time by which the event or packet must be processed by network device 30 (e.g., the cutoff time). System load prediction module 54 then examines each time slot occurring prior in time to the cutoff time, one time slot at a time, in an attempt to identify a time slot with sufficient available capacity to process the event or packet. Upon identifying such a time slot, system load prediction module 54 schedules the event or packet in the time slot. If system load prediction module 54 does not identify a time slot with sufficient available capacity, system load prediction module 54 may schedule the event or packet at the time slot having the most available capacity, even though the amount of available capacity is less than the capacity required to process the event or packet. To cause the system event or control packet to occur at the scheduled time slot, system load prediction module 54 may change configuration information stored within configuration data 46 or may set a configurable field of a packet to the value corresponding to the scheduled time slot.

After scheduling all known system events and control packets, network device 30 may receive new control packets, be configured to perform new system events, or the recurrence interval for one or more known system events or control packets may change. System load prediction module 54 may reschedule previously scheduled system events or control packets based on updated configuration information or updated recurrence interval determinations, for example. When network device 30 receives a new control packet, system load prediction module 54 attempts to identify whether or not the control packet is a recurring control packet or a one-time control packet by examining the control packet. System load prediction module 54 may identify the network protocol associated with the control packet and various configuration parameters for the network protocol included within the control packet. If system load prediction module 54 is unable to determine if the control packet is a recurring control packet, system load prediction module 54 may, upon receiving a second or subsequent corresponding control packet from the same device, determine that the control packet is a recurring packet and calculate the recurrence interval based on the amount of time that elapsed between receiving each corresponding control packet.

In general, DHCP module 56, high availability module 58, and each of L3-L7 service modules 60 exchange messages with system load prediction module 54 to configure the timings of control packets (e.g., schedule the control packets). In one example, network device 30 receives a control packet from a device (e.g., residential gateway 18 of FIG. 1) configured in accordance with the DHCP protocol. DHCP module 56 identifies the control packet as a DHCP request packet that includes a requested DHCP lease duration. DHCP module 56 generates and sends a message to system load prediction module 54 requesting that system load prediction module 54 reserve system capacity for DHCP module 56 to process a future DHCP renewal. The message includes information identifying the about when the DHCP renewal packet was received, the requested lease duration or some other recurrence interval that is determined based on a lease duration configured by DHCP module 56, and information identifying the control packet expected to be received as a DHCP renewal packet. The message may include two or more different options for the lease duration.

System load prediction module 54 receives the message from DHCP module 56, identifies a DHCP renewal packet as being a schedulable control packet, and extracts the requested lease duration as a requested recurrence interval. System load prediction module 54 then schedules the DHCP renewal packet based on the parameters specified in the message received from DHCP module 56. If multiple different lease durations are include in the message, system load prediction module 54 may schedule the DHCP renewal packet by attempting to schedule the DHCP renewal packet at each recurrence interval. If one interval has sufficient available processing capacity, system load prediction module 54 schedules the DHCP renewal packet in that interval. Upon scheduling the DHCP renewal packet, system load prediction module 54 generates and sends a message to DHCP module 56 indicating the scheduled interval as a lease renewal duration. DHCP module 56 then generates a DHCP ACK message that includes the lease renewal duration specified by the message received from system load prediction module 54 and sends the DHCP ACK message to the device from which the DHCP renewal was received. In this manner, system load prediction module 54 may avoid protocol control packet and system event synchronizations that may overload network device 30 and may result in network and/or device errors.

FIG. 3 is a conceptual diagram illustrating an example system load prediction table 70 consistent with this disclosure. For purposes of illustration, load prediction table 70 may be described below within the context of example network device 30 of FIG. 2 and example network system 2 of FIG. 1 and may represent system load prediction data 62. In this example embodiment, load prediction table 70 includes a time slot column 72, an expected load column 74, and a reserved buffer column 76. As discussed above, system load prediction module 54 may use information from load prediction table 70 to schedule system events and protocol control packets.

Time slot column 72 includes a value that uniquely identifies each time slot within system load prediction table 70. Each time slot includes two components, an expected load 74 and a reserved buffer 76. Expected load 74 represents the amount of system load predicted to occur during the corresponding time slot. Reserved buffer 76 specifies an amount of system capacity that is reserved to process other system events or control packets that are not scheduled (e.g., control packets for which no timing information is available).

System load prediction module 54 populates load prediction table 70 based on the determined system events and control packets as well as the messages received from DHCP module 56, high availability module 58, and L3-L7 modules 60 of network device 30. When scheduling control packets and system events, system load prediction module 54 identifies a time slot as being full when the amount of system load specified by the expected load combined with amount of system capacity specified by the reserved buffer is equal to or greater than the total system capacity of network device 30. The total predicted system load is greater than the total system capacity of network device 30 in instances where the expected load is greater than the amount of system capacity available after removing the reserved buffer or when the expected load is greater than the total system capacity of network device 30.

As shown in FIG. 3, protocol "a" receives a periodic control packet every one time slot, protocol "b" receives a periodic control packet every third time slot, and protocols "c" and "d" receive periodic control packets every second time slot. Predictive system load module 54 scheduled the control packets such that the expected load is "Wa" at time slot "1," "Wa+Wc+Wd" at time slot "2," "Wa+Wb" at time slot "3," and "Wa+Wc+Wd" at time slot "4," where the capital "W" represents a weighting factor that corresponds to the amount of work required by network device 30 in order to process the control packet and the lowercase letter indicates the system event or protocol control packet scheduled to occur in the time slot. While each event is shown as having "W" weighting factor, the weighting factor for each event may be different and, in some instances, the weighting factor for the same event may be different in different time slots.

In one example, network device 30 has a total system capacity of ten units of work within any one time slot, protocol "a" requires three units of work to process, protocol "b" requires two units of work to process, protocols "c" and "d" each require one unit of work to process, and the reserved buffer "z" is set to three units of work. In this example, time slot 1 has an expected load of three units of work with three units of work reserved in the buffer. Therefore, system load prediction module 54 may schedule a system event or control packet requiring four units of work or less in time slot 1. In time slot 4, the expected system load is five units (three for protocol "a" and one each for protocols "c" and "d") plus the reserved buffer of three units, for a total of eight units of work scheduled for time slot 4.

If system load prediction module 54 analyzes time slot 4 to determine if system load prediction module 54 may schedule a system event or control packet having configurable timings in time slot 4 where the system event or control packet requires more than two units of work to complete, system load prediction module 54 will determine that the event should not be scheduled in time slot 4. However, if system load prediction module 54 is attempting to schedule a system event or control packet that does not have configurable timings, system load prediction module 54 may schedule the event in time slot 4 even though system load prediction module 54 may determine that there is not sufficient available system capacity.

Figure 4:
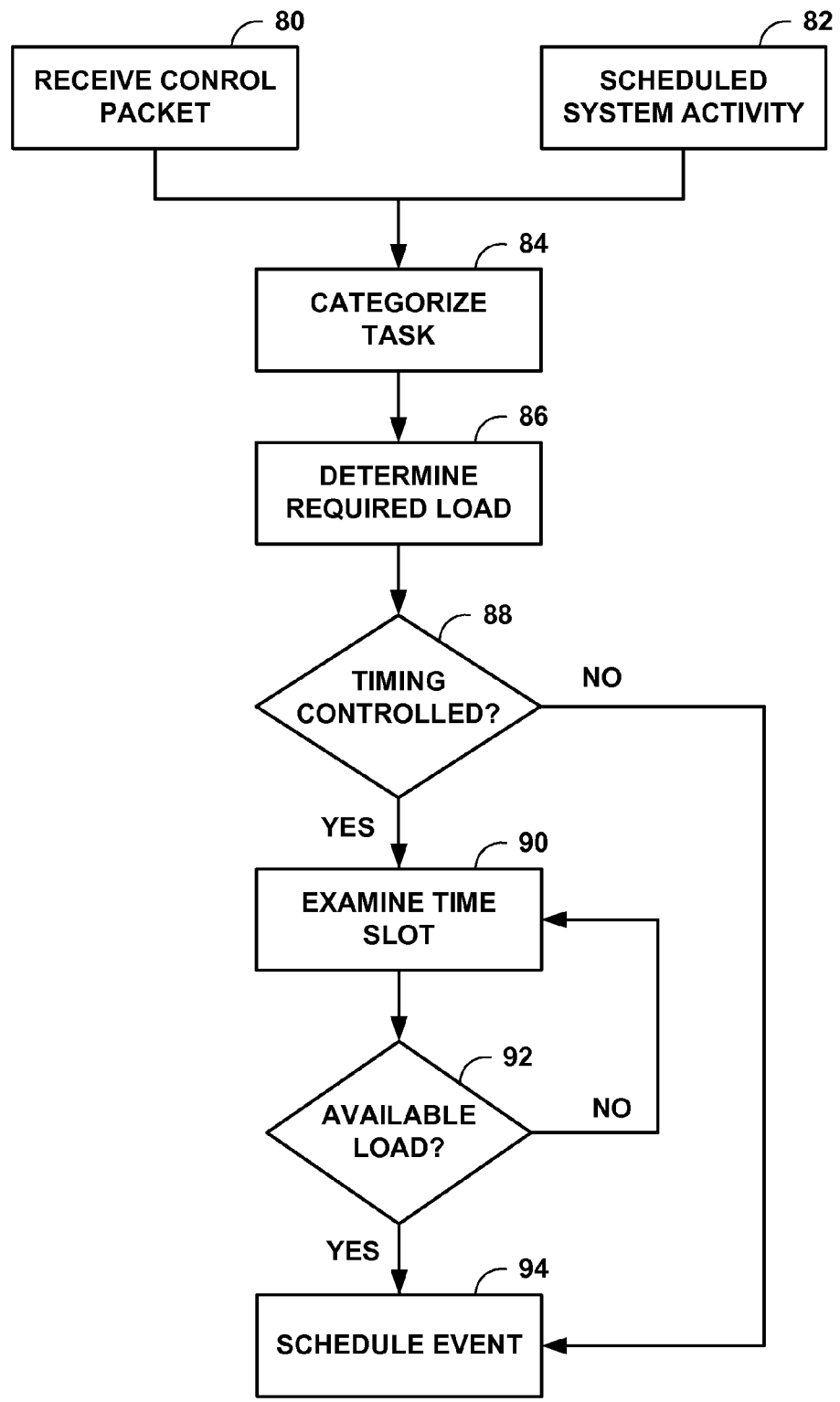
FIG. 4 is a flowchart illustrating an example operation of a network device that implements various aspects of the techniques described in this disclosure.

FIG. 4 is a flowchart illustrating an example method for predicting future system load and scheduling system events and control packets, in accordance with one aspect of this disclosure. For purposes of clarity, the method shown in FIG. 4 will be described with respect to network system 2 of FIG. 1 and the network device 30 of FIG. 2. Network device 30 may receive a control packet via one of IFCs 40 from a device located in one of subscriber networks 10 (e.g., residential gateway 18A) (80) and/or may determine that a system event or activity needs to be scheduled (82).

System load prediction module 54 analyzes configuration information (e.g., information stored in configuration data 46) or a message received from a module configured to process the received control packet (e.g., DHCP module 56) to categorize the event into one of various different types of events (84). For example, system load prediction module 54 categorizes control packets into control packets for which no timing information is available (e.g., no information as to when the control packet may be received by network device 30), control packets that are one-time control packets with configurable timings, control packets that network device 30 receives periodically but cannot control or configure when the control packets are received or processed by network device 30, and control packets that network device 30 receives periodically and can control or configure the timings when the control packets are received or processed by network device 30. Similarly, system load prediction module 54 categorizes system events into system events that do not occur at regular time intervals, system events that are one-time system events having timings that can be controlled, system events that occur at regular time intervals but whose timings cannot be controlled, and system events that occur at regular time intervals and whose timing can be controlled.

System load prediction module 54 then determines the amount of work that will be performed by network device 30 when processing the control packet or performing the system event (86). The amount of work performed by network device 30 is the amount of load network device 30 will incur upon processing the control packet or performing the system event to completion, where the load includes at least the amount of processing performed by network device 30. Based on the earlier categorization, system load prediction module 54 also determines whether the events that occur at a predictable interval have configurable timings such that system load prediction module 54 may control when future control packets are received or future system events are performed (88). Events that occur a predictable interval, but do not have configurable timings ("NO" branch of 88) are scheduled by system load prediction module 54 in the time slot corresponding to when the event is next predicted to occur (94). System load prediction module 54 may schedule the event by reserving the amount of system load capacity required to process the control packet or perform the system event as determined in step (86) within the predicted time slot.

System load prediction module 54 attempts to schedule events that occur at a predictable interval and have configurable timings ("YES" branch of 88) in a time slot having sufficient available system load capacity to perform the event without exceeding a maximum system load capacity. In one example, system load prediction module 54 first examines a time slot that corresponds to timing information included within the control packet or within the configuration information for the system event to determine the amount of available system load capacity in the time slot (90). If the time slot has sufficient available load capacity to perform the event ("YES" branch of 92), system load module 54 schedules the event by reserving the required amount of system load capacity at the time slot (94).

If the time slot does not have sufficient available load capacity to perform the event ("NO" branch of 92), system load prediction module 54 identifies another eligible time slot and analyzes the other eligible time slot to determine if sufficient system load capacity is available in the other eligible time slot (90). System load prediction module 54 may identify another eligible time slot in several different manners. In one example, system load prediction module 54 is configured to examine the next earlier time slot. In another example, system load prediction module 54 is configured to identify whether the event may be scheduled in an earlier or later time slot and whether the event has cutoff time by which the event must be performed or else one or more errors may result. In either example, system load prediction module 54 may be configured to identify a window of eligible time slots and select the time slot in the window having the most amount of available system capacity.

Upon identifying a time slot having sufficient available system load capacity, system load prediction module 54 schedules the event in the selected time slot (94). That is, system load prediction module 54 reserves the predicted required system load at the time slot. In some examples, system load prediction module 54 may also update configuration information stored within network device 30 to cause the event to occur within the selected time slot. In other examples, system load prediction module 54 may change or insert a value within a control packet or inter-process message to cause future control packets to be received within the selected time slot. After scheduling events, network device 30 processes the scheduled events to completion at the time corresponding to the selected time slot.

Figure 5:
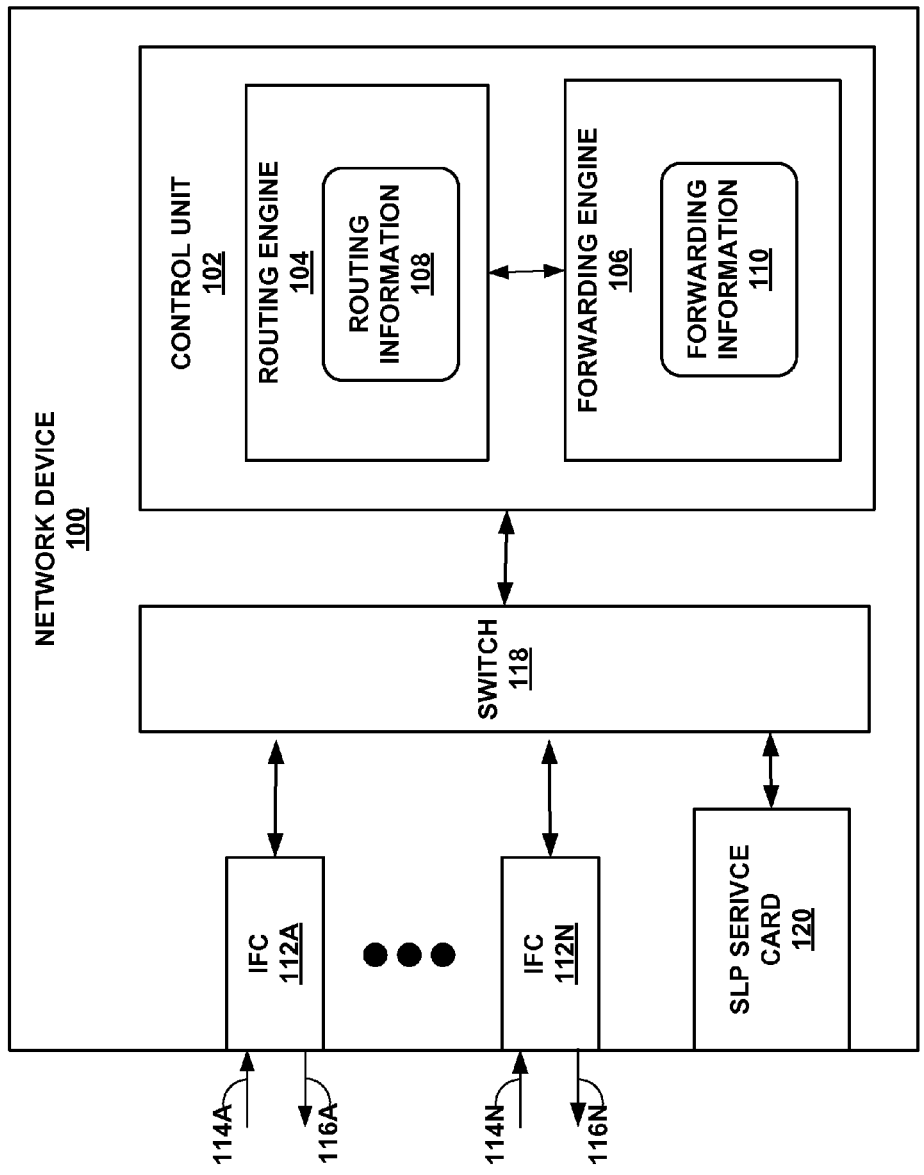
FIG. 5 is a block diagram illustrating another example network device that implements the techniques of this disclosure.

FIG. 5 is a block diagram illustrating another example network device 100 that may implement the techniques of this disclosure. Although described with respect to network device 100, any device capable of performing system load prediction techniques may implement the techniques described herein and the techniques should not be limited to the example set forth in FIG. 5.

As shown in FIG. 5, network device 100 includes control unit 102 that comprises a routing engine 104 and a forwarding engine 106. Routing engine 104 is primarily responsible for maintaining routing information 108 to reflect the current topology of a network and other network entities to which it is connected. In particular, routing engine 104 maintains routing information 108 to accurately reflect the topology of the network and other entities. In accordance with routing information 108, forwarding engine 106 maintains forwarding information 110 that associates network destinations with specific next hops and corresponding interfaces ports.

Network device 100 includes a set of interface cards (IFCs) 112A-112N ("IFCs 112") for communicating packets via inbound links 114A-114N ("inbound links 114") and outbound links 116A-116N ("outbound links 116"). Each of IFCs 112 couple to and communicate with control unit 102 via switch 118. Switch 118 may comprise any communication medium capable of communicatively coupling one or more endpoints, e.g., IFCs 112, control unit 102, and a system load prediction service card 120. Forwarding engine 106 may receive packet forwarded via switch 108 from IFCs 112 and forward those packets via switch 118 and IFCs 112 on outbound links 116 according to forwarding information 110. In this manner, forwarding engine 116 provides the forwarding functionality of network device 100.

Network device 100 also includes above noted system load prediction service card 110. In some embodiments, system load prediction service card 120 includes modules similar to system load prediction module 54, DHCP module 56, high availability module 58, and L3-L7 services modules 60 shown in FIG. 2. System load prediction service card 120 may be referred to as a service plane entity in that it resides in a service plane separate from the routing and forwarding planes represented by routing engine 104 and forwarding engine 106, respectively. This service plane entity, which is commonly abbreviated as "SPE," may provide an interface by which one or more cards may be inserted into a chassis. Each of these cards may include one or more distributed system load prediction modules while the SPE executes the system load prediction modules. Regardless of the implementation details, system load prediction service card 120 may implement the techniques described in this disclosure to predict future system loads of network device 100 and schedule system events and protocol control packets in order to reduce the occurrence of system event and control packet bursts.

To illustrate the flow of packets with respect to the exemplary configuration of network device 100, assume network device 100 replaces network device 14A of FIG. 1 and that one of IFCs 112, e.g., IFC 112A, may receive a protocol control packet originated by one of residential gateways 18, e.g., residential gateway 18A. IFC 112A forwards this packet to forwarding engine 106 via switch 118, where forwarding engine 106 forwards this packet to system load prediction service card 120. System load prediction service card 120 may provide services other than event scheduling services (e.g., DHCP service). Upon scheduling the control packet in accordance with the techniques of this disclosure as described in more detail above, system load prediction service card 120 forwards the modified packet generated as a result of performing these techniques (e.g., the DHCP offer packet having the scheduled time slot reflected in the DHCP renewal time field of the DHCP offer packet) back to forwarding engine 106. Forwarding engine 106 then forwards this modified packet via an appropriate one of IFCs 112 as specified by forwarding information 110.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the invention have been described. These and other embodiments are within the scope of the following claims.

The invention claimed is:

1. A method comprising:
storing, with a network device, data defining a plurality of time slots, wherein the network device includes one or more processors that provide an amount of system processing capacity for each of the plurality of time slots;
executing a network communication protocol with the one or more processors;
executing a load prediction software module that computes a prediction of a future network communication events that the network device is expected to perform in accordance with the network communication protocol, wherein the load prediction software module computes for each of the predicted future network communication events an amount of system processing capacity required from the one or more processors to complete in accordance with the network communication protocol; and
distributing each of the predicted future network communication events across the plurality of time slots to reserve the amount of system processing capacity required to complete each of the predicted future network communication events distributed to each of the plurality of time slots from an amount of available system processing capacity of each of the plurality of time slots without exceeding a threshold associated with the plurality of time slots, wherein the threshold limits utilization of the amount of system processing capacity for each of the plurality of time slots, wherein distributing each of the predicted future network communication events across the plurality of time slots further comprises at least one of changing configuration information of the network device or configuring a network communication to cause the predicted future network communication events to be scheduled to occur in the time slot in which each of the predicted future network communication events is distributed.

2. The method of claim 1, further comprising:
executing another network communication protocol with the one or more processors of the network device;
executing the load prediction software module to compute a prediction of one or more other future network communication events that the network device is expected to perform in accordance with the other network communication protocol, wherein the load prediction software module computes for each of the other predicted future network communication events another amount of system processing capacity required from the one or more processors to complete in accordance with the other network communication protocol; and
distributing the other predicted future network communication events across the plurality of time slots to reserve the other amount of system processing capacity required to complete the other predicted future network communication events from the amount of available system processing capacity for each of the plurality of time slots.

3. The method of claim 1, further comprising:
executing the load prediction software module to compute a prediction of one or more future system events based on at least one of configuration information and historical system event information of the network device, wherein the load prediction software module computes for each of the predicted future system events an amount of the system processing capacity required from the one or more processors to complete; and distributing the predicted future system events across the plurality of time slots to reserve the amount of system processing capacity required to complete the predicted future system events from the amount of available system processing capacity at each of the plurality of time slots without exceeding the threshold associated with the plurality of time slots.

4. The method of claim 1, further comprising:

determining whether one of the predicted future network communication events includes timing information that corresponds to a time slot of the plurality time slots in which the predicted network communication must be completed;

when the one of the predicted future network communication events includes timing information, determining whether the amount of available system processing capacity of the time slot is equal to or greater than the amount of system processing capacity required to complete the one of the predicted future network communication events; and when the amount of available system processing capacity of the time slot is equal to or greater than the amount of system processing capacity required to complete the one of the predicted future network communication events, reducing the amount of available system processing capacity of the time slot by the amount of system processing capacity required to process the predicted future network communication event.

5. The method of claim 4, further comprising:

in response to determining that the amount of available system processing capacity is less than the amount of system processing capacity required to complete the one of the predicted future network communication events, determining whether the timing information of the one of the network communication events is configurable timing information;

identifying another time slot of the plurality of time slots when the timing information is determined to be configurable timing information;

determining whether the amount of available system processing capacity of the other time slot is equal to or greater than the amount of system processing capacity required to complete the one of the predicted future network communication events; and reducing the amount of available system processing capacity of the other time slot by the amount of system processing capacity required to process the predicted future network communication event when the amount of available system processing capacity of the other time slot is equal to or greater than the amount of system processing capacity required to complete the one of the predicted future network communication events.

6. The method of claim 1, wherein distributing the predicted future network communication events further comprises:

identifying a subset of the plurality of time slots as a window of time slots;

determining an available system processing capacity at each time slot of the window of time slots;

selecting a time slot of the window of time slots having a greatest amount of available system processing capacity; and reducing the amount of available system processing capacity of the selected time slot by the amount of system processing capacity required to process the predicted future network communication event.

7. The method of claim 1, further comprising:

determining whether each of the predicted future network communication events does not include timing information, includes timing information that is not configurable, or includes timing information that is configurable; and distributing each of the predicted future network communication events based on the determination.

8. The method of claim 1, further comprising:

reducing the amount of available system processing capacity available at each of the plurality of time slots by an amount of system processing capacity reserved by a reserve buffer.

9. The method of claim 1, wherein predicting future network communication events is further based on at least one of historical network communication information, configuration information, and a type of the network communication protocol.

10. The method of claim 1, wherein the network communication event comprises receiving, from a client device, a network protocol control packet or generating, with the network device, a different network protocol control packet, and wherein the network protocol control packet and the different network protocol control packet are configured in accordance with of one of a dynamic host control protocol, a point-to-point protocol, an access node control protocol, mobile internet protocol, multiprotocol label switching-based keep-alive mechanism, and a layer two tunnel protocol.

11. A network device comprising:

a data repository configured to store data defining a plurality of time slots;

one or more programmable processors that provide an amount of system processing capacity for each of the plurality of time slots;

a network communication protocol module executable by the one or more programmable processors to perform network communication events in accordance with a network communication protocol; and a system load prediction module configured to compute a prediction of one or more future network communication events that the network device is expected to perform in accordance with the network communication protocol, compute, for each of the predicted future network communication events, an amount of system processing capacity required from the one or more programmable processor to complete in accordance with the network communication protocol, and distribute each of the predicted future network communication events across the plurality of time slots to reserve the amount of system processing capacity required to complete each of the predicted future network communication events distributed to each of the plurality of time slots from the amount of available system processing capacity of each of the plurality of time slots without exceeding a threshold associated with the plurality of time slots, wherein the threshold limits utilization of the amount of system processing capacity for each of the plurality of time slots, wherein the system load prediction module is configured to distribute each of the predicted future network communication events across the plurality of time slots by being configured to perform at least one of changing configuration information of the network device or configuring a network communication to cause the predicted future network communication events to be scheduled to occur in the time slot in which each of the predicted future network communication events is distributed.

12. The network device of claim 11, further comprising:
another network communication protocol module executable by the one or more programmable processors to perform other network communication events in accordance with another network communication protocol,
wherein the system load prediction module is configured to compute a prediction of one or more other future network communication events that the network device is expected to perform in accordance with the other network communication protocol, compute, for each of the other predicted future network communication events, another amount of system processing capacity required from the one or more processors to complete in accordance with the other network communication protocol, and distribute the other predicted future network communication events across the plurality of time slots to reserve the other amount of system processing capacity required to complete the other predicted future network communication events from the amount of available system processing capacity for each of the plurality of time slots.

13. The network device of claim 11, further comprising:
a data repository configured to store configuration information of the network device and historical system event information of the network device,
wherein the system load prediction module is configured to compute a prediction of one or more future system events based on at least one of configuration information and historical system event information of the network device, compute, for each of the predicted future system event, an amount of the system processing capacity required from the one or more programmable processors to complete, and distribute the predicted future system events across the plurality of time slots to reserve the amount of system processing capacity required to complete the predicted future system events from the amount of available system processing capacity at each of the plurality of time slots without exceeding the threshold associated with the plurality of time slots.

14. The network device of claim 11, wherein the system load prediction module is configured to determine whether one of the predicted future network communication events includes timing information that corresponds to a time slot of the plurality time slots in which the predicted network communication must be completed, when the one of the predicted future network communication events includes timing information, determine whether the amount of available system processing capacity of the time slot is equal to or greater than the amount of system processing capacity required to complete the one of the predicted future network communication events, and when the amount of available system processing capacity of the time slot is equal to or greater than the amount of system processing capacity required to complete the one of the predicted future network communication events, reserve the amount of system processing capacity required to process the predicted future network communication event at the time slot.

15. The network device of claim 14, wherein the system load prediction module is configured to, in response to determining that the amount of available system processing capacity is less than the amount of system processing capacity required to complete the one of the predicted future network communication events, determine whether the timing information of the one of the network communication events is configurable timing information, identify another time slot of the plurality of time slots when the timing information is determined to be configurable timing information, determine whether the amount of available system processing capacity of the other time slot is equal to or greater than the amount of system processing capacity required to complete the one of the predicted future network communication events, and reserve the amount of system processing capacity required to process the predicted future network communication event at the other time slot when the amount of available system processing capacity of the other time slot is equal to or greater than the amount of system processing capacity required to complete the one of the predicted future network communication events.

16. The network device of claim 11, wherein the system load prediction module is configured to identify a subset of the plurality of time slots as a window of time slots, determine an available system processing capacity at each time slot of the window of time slots, select a time slot of the window of time slots having a greatest amount of available system processing capacity, and reserve the amount of system processing capacity required to process the predicted future network communication event at the selected time slot.

17. The network device of claim 11, wherein the system load prediction module is configured to determine whether each of the predicted future network communication events does not include timing information, includes timing information that is not configurable, or includes timing information that is configurable, and distribute each of the predicted future network communication events based on the determination.

18. A computer-readable storage medium encoded with instructions for causing one or more programmable processors of a network device to:
store data defining a plurality of time slots, wherein the one or more processors that provide an amount of system processing capacity for each of the plurality of time slots;
execute a network communication protocol;
execute a load prediction module that computes a prediction of one or more future network communication events that the network device is expected to perform in accordance with the network communication protocol, wherein the load prediction module computes for each of the predicted future network communication events an amount of system processing capacity required from the one or more processors to complete in accordance with the network communication protocol; and
distribute each of the predicted future network communication events across the plurality of time slots to reserve the amount of system processing capacity required to complete each of the predicted future network communication events distributed to each of the plurality of time slots from the amount of available system processing capacity of each of the plurality of time slots without exceeding a threshold associated with the plurality of time slots, wherein the threshold limits utilization of the amount of system processing capacity for each of the plurality of time slots, wherein distributing each of the predicted future network communication events across the plurality of time slots further comprises at least one of changing configuration information of the network device or configuring a network communication to cause the predicted future network communication events to be scheduled to occur in the time slot in which each of the predicted future network communication events is distributed.

19. A method comprising:
- storing, with a network device, data defining a plurality of time slots, wherein the network device includes one or more processors that provide an amount of system processing capacity for each of the plurality of time slots;
- executing a dynamic host configuration protocol (DHCP) with the one or more processors;
- receiving, with the network device and from a client device, a DHCP packet;
- executing a load prediction software module that computes a prediction of a future DHCP event that the network device expects to perform in accordance with the DHCP, wherein the load prediction software module computes for the predicted future DHCP event an amount of system processing capacity required from the one or more processors to complete in accordance with the DHCP, and wherein the prediction is based at least in part on the DHCP packet;
- scheduling the predicted future DHCP event during a time slot of the plurality of time slots to reserve the amount of system processing capacity required to complete the predicted future DHCP event from the amount of available system processing capacity of the time slot without exceeding a threshold associated with the time slot, wherein the threshold limits utilization of the amount of system processing capacity for the time slot; and
- sending, from the network device and to the client device, a DHCP message to cause the client device to send a future DHCP packet to the network device at the time slot, wherein the DHCP message includes a lease renewal duration corresponding to the time slot during which the predicted future DHCP event is scheduled.

* * * * *